Patented Jan. 7, 1936

2,027,021

UNITED STATES PATENT OFFICE 2,027,021

PROCESS OF MANUFACTURE OF DECORATIVELY COLORED ARTICLES

Albert Exton Cleghorn, Brooklyn, N. Y., assignor to Travatex Products Corporation, New York, N. Y., a corporation of New Jersey No Drawing. Application February 4, 1932, Serial No. 590,988

4 Claims. (Cl. 106—29)

This invention relates to the coloring of articles cast of plastic magnesia or any other composition which is sufficiently basic in reaction to cause precipitation of colored metal hydroxides. The object is to produce the article of the desired decorative color more uniformly and economically.

The fundamental idea is that a solution of a soluble salt such as a ferric salt, for example, on coming into contact with the basic ingredients of the magnesium oxychloride cement will precipitate in the form of a colored oxide which will be more efficiently dispersed than is possible with a pigment mechanically mixed, and which will therefore give an unusually high efficiency of coloring action. While such a principle has been used in the manufacture of pigments themselves it has never previously to my knowledge been used in production of the desired decorative color in cast articles of plastic magnesia or other basic compositions.

There are at least three possible ways of adding these salts, that is, dry or in solution in water, or dissolved in a solution of one of the ingredients. In selecting a method we must of course give due weight to the nature of the salt with which we are working. To maintain the solution of the salt in water for commercial operation a small amount of acid may be necessary to repress hydrolysis. By reaction the metal salt and basic ingredients of the mix produce the colored metal hydroxide or oxide and a neutral salt. The metal salt when added to the mix dissolves and then reacts in the same way as when added in solution.

Typical examples of such salts would be ferric chloride, and ferric sulfate. It is also found that ferrous solutions under similar conditions will be oxidized by the amount of dissolved oxygen present, to the ferric condition, and therefore behave quite similarly to a ferric salt. Copper salts can also be used and unquestionably other desirable appearances and colors can be obtained by suitable selection of other compounds.

As a specific embodiment of my invention I take about 85 pounds of marble dust graded as "through 8 mesh on 20 mesh" and add about 13 to 15 pounds of magnesite varying with the degree of purity. This is contained in a mixer of the type of a concrete mixer. To this mix I add about 7 to 8 liquid quarts of magnesium chloride of about 21 to 25 degrees Baumé and about 1 to 1½ quarts of magnesium sulfate about 21 to 25 degrees Baumé. To this mix there is added about 1 ounce of commercial powdered anhydrous ferric sulfate to give a faint brown color or as much as four ounces of the ferric sulfate for a light brown color. The amount required is much less than is required of a commercial pigment to give a similar coloring.

As a further extension of the idea outlined for coloring of cast articles an additional ingredient may be incorporated in the mix and then caused to react with another ingredient added later. As an illustrative example there may be used a mix of plastic magnesia and ground marble similar to that described above. To this may be added the magnesium chloride solution or an aqueous solution containing dissolved sodium or potassium chromate. The addition of a solution of a lead salt to the mix will produce a precipitate of lead chromate intimately mixed with the product. Similar applications will at once be apparent to one versed in the art.

Of course, modifications may be made without departing from the invention as claimed.

I claim:

1. The process of manufacture of an article having a desired decorative color consisting in casting the same from a plastic magnesia composition to which has been added a metal salt or its solution in water with or without one of the ingredients of the mix to the plastic mix and in prescribed or predetermined amount and chosen with reference to producing by its reaction the desired decorative color by the resultant colored hydroxide or oxide of the metal.

2. The process of manufacture of a decoratively colored plastic magnesia article with a desired decorative color by the addition to the plastic magnesia, magnesium chloride and other ingredients of a metal salt of predetermined amount and of a character both predetermined by the color desired in which mix said salt dissolves and with which it reacts to give a colored hydroxide or oxide of the metal decoratively coloring the article with the color or shade of color desired.

3. The process of manufacture of a decoratively colored article of a prescribed color cast from a plastic composition by adding a sufficient amount of an iron salt or its solution in water with or without one of the ingredients of the mix to the plastic mix, said salt by being of a character and of an amount proper for producing the desired quantity of colored hydroxide or oxide of the iron and hence the desired or prescribed color in the article.

4. The process of manufacture of a decoratively colored article of the desired color cast from a plastic magnesia composition by addition in predetermined amount of a copper salt or its solution in water with or without one of the ingredients of the mix to the plastic mix, said salt by its reaction giving a colored hydroxide or oxide of the copper and hence the desired or prescribed color in the article.

ALBERT EXTON CLEGHORN.